US007515634B2

(12) United States Patent
Chang

(10) Patent No.: US 7,515,634 B2
(45) Date of Patent: Apr. 7, 2009

(54) COMPUTATIONALLY CONSTRAINED VIDEO ENCODING

(75) Inventor: Chienchung Chang, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 620 days.

(21) Appl. No.: 10/187,091

(22) Filed: Jun. 28, 2002

(65) Prior Publication Data

US 2004/0001545 A1      Jan. 1, 2004

(51) Int. Cl.
*H04N 7/12* (2006.01)

(52) U.S. Cl. .............. 375/240.12; 375/240; 375/240.01

(58) Field of Classification Search ............ 375/240.12, 375/240.16, 240, 240.01; 382/243
See application file for complete search history.

(56) References Cited

U.S. PATENT DOCUMENTS

| 5,748,789 | A | * | 5/1998 | Lee et al. ................... 382/243 |
| 6,195,389 | B1 | * | 2/2001 | Rodriguez et al. ..... 375/240.16 |
| 6,535,238 | B1 | * | 3/2003 | Kressin ................... 348/14.01 |
| 2002/0031188 | A1 | | 3/2002 | Negishi et al. |

FOREIGN PATENT DOCUMENTS

| EP | 0919952 | 6/1999 |
| FR | 2796778 | 7/1999 |

OTHER PUBLICATIONS

Haridasan, et al., *Scalable Coding of Video Object*: ISCAS (1998) IEEE, vol. 4:289-292.
Mattavelli, et al., *Implementing Real Time Video Decoding on Multimedia Processors by Complexity Prediction Techniques*: Proceedings of the 1998 17th Conference on Consumer Electronics (Jun. 1998).

* cited by examiner

*Primary Examiner*—Allen Wong
(74) *Attorney, Agent, or Firm*—Thomas R. Rouse

(57) ABSTRACT

Video encoding techniques are described that involve determining a number of processing cycles used during encoding of a video frame, and encoding the video frame without using motion estimation techniques when a number of processing cycles used during encoding exceeds a threshold. For example, the threshold may define a number of processing cycles available for encoding of the given video frame, and the determined number of processing cycles may be a counted number of cycles used during the encoding process of the given video frame. If the number of processing cycles used during encoding exceeds the threshold, motion estimation techniques can be discontinued in favor of less computationally intensive encoding techniques such as texture encoding.

62 Claims, 6 Drawing Sheets

COMPUTATIONALLY CONSTRAINED VIDEO ENCODING

TECHNICAL FIELD

The invention relates to digital video processing and, more particularly, encoding of video sequences.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. These and other digital video devices can provide significant improvements over conventional analog video systems in creating, modifying, transmitting, storing, recording and playing full motion video sequences.

A number of different video encoding standards have been established for communicating digital video sequences. The Moving Picture Experts Group (MPEG), for example, has developed a number of standards including MPEG-1, MPEG-2 and MPEG-4. Other standards include ITU H.263, QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac, Inc. These and other standards, including standards yet to be developed, will continue to evolve.

Many video encoding standards achieve increased transmission rates by encoding data in a compressed fashion. Compression can reduce the overall amount of data that needs to be transmitted for effective transmission of image frames. The MPEG standards, for example, utilize graphics and video compression techniques designed to facilitate video and image transmission over a narrower bandwidth than can be achieved without the compression. In particular, the MPEG standards support video encoding techniques that utilize similarities between successive image frames, referred to as temporal or interframe correlation, to provide interframe compression. The interframe compression techniques exploit data redundancy across frames by converting pixel-based representations of image frames to motion representations. In addition, the video encoding techniques may utilize similarities within image frames, referred to as spatial or intraframe correlation, in order to achieve intra-frame compression in which the motion representations within an image frame can be further compressed. The intraframe compression is typically based upon texture encoding processes for compressing still images, such as discrete cosine transform (DCT) encoding.

To support the compression techniques, many digital video devices include an encoder for compressing digital video sequences, and a decoder for decompressing the digital video sequences. In many cases, the encoder and decoder comprise an integrated encoder/decoder (CODEC) that operates on blocks of pixels within frames that define the sequence of video images. In the MPEG-4 standard, for example, the encoder of a sending device typically divides a video image frame to be transmitted into macroblocks comprising a 16 by 16 pixel array. For each macroblock in the image frame, the encoder searches macroblocks of the immediately preceding video frame to identify the most similar macroblock, and encodes the differences between the macroblocks for transmission, along with a motion vector that indicates which macroblock from the previous frame was used for encoding. The decoder of a receiving device receives the motion vector and encoded differences, and performs motion compensation to generate video sequences.

The video encoding process is computationally intensive, particularly when motion estimation techniques are used. For example, the process of comparing video blocks to video blocks of a previously transmitted frame requires large numbers of computations. Improved encoding techniques are highly desirable, particularly for use in wireless devices or other portable video devices where computational resources are more limited and power consumption is a concern. In addition, techniques are desirable to facilitate real-time encoding in such wireless devices.

SUMMARY

This disclosure describes video encoding techniques. The video encoding techniques may involve determining a number of processing cycles used during encoding of a video frame, and selectively encoding the video frame using different encoding modes based on the determined number of processing cycles. If the determined number of processing cycles does not exceed a threshold, encoding of the video frame may be performed in a first encoding mode using motion estimation techniques. However, a second mode of encoding of the video frame that does not use motion estimation techniques can be used if the determined number of processing cycles exceeds the threshold.

The threshold may define a number of processing cycles available for encoding of the given video frame, and the determined number of processing cycles may be a counted number of cycles used during the encoding process of the given video frame. If the determined number of processing cycles exceeds the threshold, motion estimation techniques can be discontinued in favor of less computationally intensive encoding techniques such as texture encoding for subsequent video blocks of the frame or for one or more subsequent frames. Hence, different encoding modes can be used on a selective basis to promote computational performance. In this manner, video encoding can be accelerated, allowing real-time encoding to be realized in devices having relatively limited processing capabilities.

The techniques may be implemented in hardware, software, firmware, or any combination thereof. If implemented in software, the techniques may be directed to a computer readable medium comprising program code, that when executed, performs one or more of the encoding techniques described herein. Additional details of various embodiments are set forth in the accompanying drawings and the description below. Other features, objects and advantages will become apparent from the description and drawings, and from the claims.

DETAILED DESCRIPTION

Figure 1:
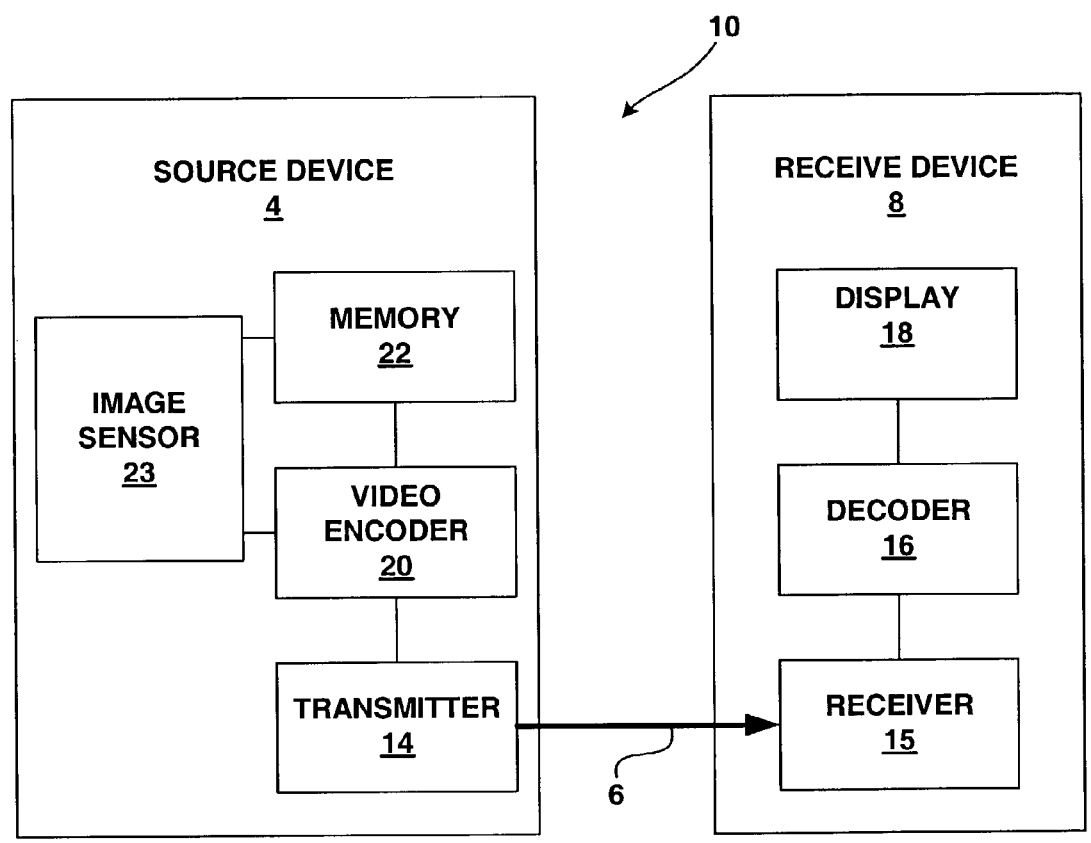
FIG. 1 is a block diagram illustrating an example system in which a source device transmits an encoded sequence of video data to a receive device.

In general, this disclosure is directed to encoding techniques that can be used to fit a video encoding scheme into a resource limited platform with the tradeoff in compression ratio. The techniques can be executed by an encoder of a digital video device in order to reduce computations in certain scenarios, accelerate processing time, and possibly reduce power consumption during video encoding. In this manner, the encoding techniques can improve video encoding according to standards such as MPEG-4, and better facilitate the implementation of video encoding within wireless devices where computational resources are more limited and power consumption is a concern. In addition, the techniques may be configured to preserve interoperability capabilities with decoding standards such as the MPEG-4 decoding standard.

The video encoding techniques described herein apply a selective encoding technique that is responsive to a computational metric within the encoding of a given video frame. The techniques may apply a first encoding mode until the computational metric exceeds a threshold, and a second encoding mode thereafter. In this manner, the video encoding techniques are capable of constraining the computational resources devoted to encoding of a particular frame.

More specifically, the video encoding techniques establish a computational budget for the encoding of a video frame. Computationally intensive motion estimation techniques (or any other computationally expensive modules in video encoding) can be used as long as the computational budget has not been exhausted. However, if the computational budget is exhausted during the encoding of a given video frame, computationally intensive techniques can be discontinued, in favor of less computationally intensive encoding techniques such as intra-frame texture encoding or motion estimation encoding over a smaller search range. The texture encoding or reduced search range motion estimation can be performed much more quickly, albeit with less compression. In this manner, it can be ensured that the encoding process for any given video frame does not take an inordinate amount of time, which could otherwise undermine transmission of video sequences in real-time. Furthermore, by dynamically defining the encoding of a given video frame, computational resources can be used more effectively, exploiting data compression associated with motion estimation when computational resources are sufficient.

A digital video device that encodes digital video data according to a standard such as the MPEG-4 standard may implement a processor, such as a digital signal processor (DSP), to execute an encoding algorithm. The encoding algorithm may implement motion estimation techniques to encode individual video blocks that make up a video frame. As mentioned, motion estimation techniques are very computationally intensive. In particular, motion estimation techniques typically involve the comparison of a video block to be encoded to some or all of the video blocks of a previously transmitted frame (or a subsequent frame) in order to identify an acceptable match for use in defining a motion vector. Furthermore, each individual comparison of one block to another may require a number of computations in order to perform pixel-wise comparisons. The processing speed of the DSP executing the algorithm, however, is generally fixed. In other words, the DSP typically operates a defined frequency in terms of cycles per second (Hz). For example, a DSP operating at a 50 megahertz clock speed typically executes approximately 50 million instructions per second.

The number of computations needed for acceptable motion estimation encoding may be unknown for any given video frame. For example, the number of computations required to encode any given video frame using motion estimation techniques may vary with the content of the video frame and the search algorithm involved. However, to promote real-time transmission of video sequences with a desired resolution, the image frames may need to be encoded within a given amount of time. In particular, approximately 15 frames per second or higher are typically needed to ensure desired resolution of a video sequence.

Because some frames take longer to encode than other frames using the motion estimation techniques, one way to ensure that the DSP can support acceptable encoding is to increase the clock speed of the DSP, and thereby ensure that the DSP can always encode the "worst case." That is, if the DSP is fast enough to encode the video frames that require the most computations within the time needed to ensure that 15 frames per second are encoded, real-time video sequences may be supported. Increasing the clock speed of a DSP, however, may be very costly from both an implementation standpoint and an operational standpoint. In particular, increased clock speed may require additional power consumption by the DSP, as well as additional design complexity. Accordingly, it is highly desirable to allow real-time video encoding to be supported by DSPs that operate at clock speeds that may not necessarily be fast enough to encode the "worst case" within time constrains imposed by real-time transmission of video sequences.

By defining a computational budget for the encoding of a given video frame, the required speed of the DSP may be reduced for a given encoding scenario. In some cases, the computational budget may be defined, at least in part, by the average number cycles used to encode previous video frames. In other words, if a previous video frame is encoded very quickly, the computational savings can be incorporated into the computational budget for a subsequent frame, possibly allowing an increased number of computations to be performed to encode the subsequent video frame. In one example, outlined in greater detail below, a moving average defining processing cycles associated with a number of previously encoded video frames may be used, in part, to define the computational budget for encoding subsequent video frames. Thus, computational savings during the encoding of previously transmitted video frames may be recycled such that the encoding of a subsequent video frame can utilize the previous computational savings, if needed. In other words, the threshold may be increased for later frames if encoding of earlier frames produce computational savings, i.e., encoding of earlier frames is performed in fewer processing cycles than the then-existing threshold. On the other hand, the overuse of computational budget in the previous frames may also be identified, and in that case, the threshold for later frames can be reduced accordingly. In other cases, the computational budget may be defined by a fixed threshold that applies for each frame and does not change over time.

The techniques described herein may be capable of providing certain advantages. For example, the techniques may facilitate a reduction in power consumption during video encoding, and may facilitate effective real-time video encoding using a DSP that operates at clock speed that is not necessarily fast enough to encode the "worst case" within the time constraints required for real-time encoding. The techniques may be particularly useful in wireless digital video devices or other portable video devices where computational resources are more limited and power consumption is a concern.

With future advances in DSP technology, DSP clock speeds will invariably increase, and power consumption will decrease for a given clock speed. Still, even with faster and more power-efficient DSPs, the techniques described herein may be very useful. For example, faster clock speeds may allow improved real-time resolution by supporting the encoding of more frames per second, or by supporting more complex imagery such as 3-dimensional imagery. Similarly, faster clock speeds may allow larger video frames to be encoded in real-time. In short, the techniques described herein are not limited for use with DSPs operating at any given clock speed, and may be equally useful for use with much faster DSPs, as the signal processing technology continues to progress. Similarly, if implemented in hardware, the hardware speed can be reduced accordingly.

FIG. 1 is a block diagram illustrating an example system 2 in which a source device 4 transmits an encoded sequence of video data over communication link 6 to a receive device 8. Source device 4 and receive device 8 are both digital video devices. In particular, source device 4 encodes and transmits video data using any one of a variety of video compression standards such as MPEG-4 developed by the Moving Picture Experts Group. Other standards may include MPEG-1, MPEG-2 or other MPEG standards developed by the Moving Picture Experts Group, ITU H.263, Motion JPEG 2000, QuickTime™ technology developed by Apple Computer of Cupertino Calif., Video for Windows™ developed by Microsoft Corporation of Redmond, Wash., Indeo™ developed by Intel Corporation, and Cinepak™ developed by SuperMac Inc.

Communication link 6 may comprise a wireless link, a physical transmission line, a packet based network such as a local area network, wide-area network, or global network such as the Internet, a public switched telephone network (PSTN), or combinations of various links and networks. In other words, communication link 6 represents any suitable communication medium, or possibly a collection of different networks and links, for transmitting video data from source device 4 to receive device 8.

Source device 4 may be any digital video device capable of encoding and transmitting video data. For example, source device 4 may include a memory 22 for storing digital video sequences, a video encoder 20 for encoding the sequences, and a transmitter 14 for transmitting the encoded sequences over communication link 6. Video encoder 20, for example, may comprise a DSP and/or a microprocessor that executes programmable software modules that define the encoding techniques.

Source device 4 may also include an image sensor 23, such as a video camera for capturing video sequences and storing the captured sequences in memory 22. In some cases, source device 4 may transmit real-time video sequences over communication link 6. In those cases, receive device 8 may receive the real-time video sequences and display the video sequences to a user.

Receive device 8 may be any digital video device capable of receiving and decoding video data. For example, receive device 8 may include a receiver 15 for receiving encoded digital video sequences, decoder 16 for decoding the sequences, and display 18 for displaying the sequences to a user.

Example devices for source device 4 and receive device 8 include servers located on a computer network, workstations or other desktop computing devices, and mobile computing devices such as a laptop computers. Other examples include digital television broadcasting satellites and receiving devices such as digital televisions, digital cameras, digital video cameras or other digital recording devices, digital video telephones such as cellular radiotelephones and satellite radio telephones having video capabilities, other wireless video devices, and the like.

In some cases, source device 4 and receive device 8 each include an encoder/decoder (CODEC) (not shown) for encoding and decoding digital video data. In that case, both source device 4 and receive device 8 may include transmitters and receivers as well as memory and displays. Many of the encoding techniques outlined below are described in the context of a digital video device that includes an encoder. It is understood, however, that the encoder may form part of a CODEC. In that case, the CODEC may be implemented as a DSP, a microprocessor, an application specific integrated circuit (ASIC), discrete hardware components, or various combinations thereof.

Source device 4, for example, operates on blocks of pixels within the sequence of video images in order to encode the video data. For example, encoder 20 of source device 4 may execute motion estimation encoding techniques in which the video image frame to be transmitted is divided into macroblocks comprising a number of smaller image blocks. For each macroblock in the image frame, video encoder 20 of source device 4 searches macroblocks stored in memory 22 for the preceding video frame already transmitted (or a subsequent video frame) to identify a similar macroblock, and encodes the difference between the macroblocks, along with a motion vector that identifies the macroblock from the previous frame that was used for encoding. In some cases, source device 4 may support programmable thresholds which can cause termination of various tasks or iterations during the encoding process in order to reduce the number of computations and conserve power.

In motion estimation, the term "task" refers to a common set of computations used to compare a current video block to a different video block within a search space. In other words, a task refers to a single comparison between a current video block and a different video block in the search space. For example, a task may involve performing a number of computations in order to compare a number of pixels of the current video block to those of the different video block. For example, 64 computations (in the case of an image block) or 256 computations (in the case of a macroblock) may comprise a task. During each task, the computations can be accumulated to define an ongoing difference value for the task (sometimes referred to as a difference metric). A decision whether to terminate any given task can be made after each computation, or alternatively, after subsets of computations, i.e., integer numbers of computations that define a subset of the task. In the later case, the integer number of computations may be programmable to provide additional flexibility to the encoding routine.

In motion estimation, the term "iteration" refers to a common set of tasks performed during video encoding. A complete series of tasks associated with a current video block is an iteration. In other words, an iteration is a set of comparisons in which a current video block is compared to a set of previous video blocks (or subsequent video blocks) in the search space. Each individual comparison is a task that involves a number of computations. Thus, a search space defines a set of video blocks that are compared to a current video block during an iteration. Each comparison of an iteration is referred to as a task, and each task, i.e., each comparison, may involve a number of computations. Iterations may be terminated prematurely, for example, if during the coarse of an iteration, an acceptable match is identified.

In performing motion estimation to encode an image frame, an iteration can be performed for each video block, e.g., macroblock or image block, of the frame. A number of tasks are performed for each iteration, and each task comprises a number of computations. Accordingly, a very large number of computations may be needed to encode an image frame using motions estimation techniques. As described in greater detail below, the establishment of a computational budget for encoding an image frame can ensure that motion estimation does not cause the computational budget to be exhausted to an extent that may undermine effective real-time video transmission.

Receiver 15 of receive device 8 may receive the encoded video data such as in the form of motion vectors and encoded differences. In that case, decoder 16 performs texture decoding and motion compensation techniques to generate video sequences for display to a user via display 18. The decoder 16 of receive device 8 may also be implemented as an encoder/decoder (CODEC). In that case, both source device and receive device may be capable of encoding, transmitting, receiving and decoding digital video sequences.

During the encoding of any given video frame, it may determined whether motion estimation techniques should be discontinued in favor of less computationally intensive encoding techniques. In other words, a first mode of encoding using motion estimation can used initially, but may be dynamically terminated if the number of used processing cycles exceeds the threshold. In that case, a second mode of encoding that does not use motion estimation may be used instead of the first mode in order to reduce the number of computations required to finish encoding the frame. As mentioned, a computational budget can be established and monitored to determine whether motion estimation should be discontinued at any given instance. If so, intra-frame compression techniques commonly used for compressing still images may be used in lieu of motion estimation.

One example of a less computationally intensive encoding technique is texture encoding using discrete cosine transform (DCT) techniques known in the art. Texture encoding can be performed much more quickly than motion estimation encoding and with fewer computations. However, texture encoding may not provide the same advantages in terms of data compression. When motion estimation is used, texture encoding can also be used in addition to the motion estimation techniques. When motion estimation is avoided, however, texture encoding or another less computationally intensive encoding technique may be used in lieu of the motion estimation, resulting in computational savings.

Figure 2:
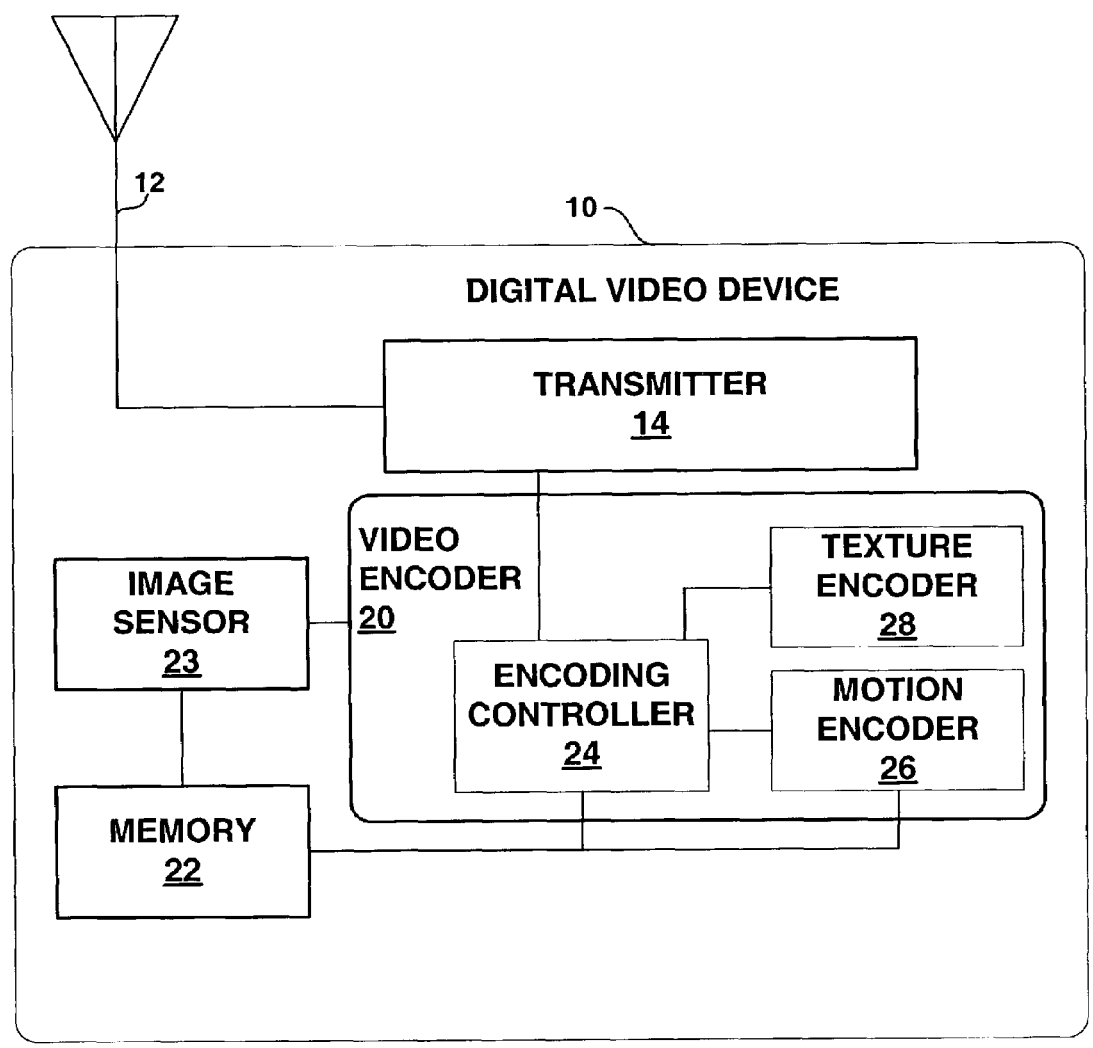
FIG. 2 is a block diagram illustrating an example digital video device incorporating a video encoder that compresses digital video sequences.

FIG. 2 is a block diagram illustrating an example digital video device 10, such as source device 4 incorporating a video encoder 20 that compresses digital video sequences according to the techniques described herein. Exemplary digital video device 10 is illustrated as a wireless device, such as a mobile computing device, a personal digital assistant (PDA), a wireless communication device, a radio telephone, and the like. However, the techniques in this disclosure are not limited to wireless devices, and may be readily applied to other digital video devices including non-wireless devices.

In the example of FIG. 2, digital video device 10 transmits compressed digital video sequences via transmitter 14 and antenna 12. Video encoder 20 encodes the video sequences and buffers the encoded digital video sequences within video memory 22 prior to transmission. For example, video encoder 20 may comprise a programmable digital signal processor (DSP), a microprocessor, one or more application specific integrated circuits (ASICs), specific hardware components, or various combinations of theses devices and components. Memory 22 may store computer readable instructions and data for use by video encoder 20 during the encoding process. For example, memory 22 may comprise synchronous dynamic random access memory (SDRAM), FLASH memory, electrically erasable programmable read only memory (EEPROM), or the like.

In some cases, digital video device 10 includes an image sensor 23 for capturing video sequences. For example, image sensor 23 may capture video sequences and store them in memory 22 for encoding. Image sensor 23 may also be coupled directly to video encoder 20 in order to improve video encoding in real-time. Encoding techniques using a computational budget for each frame may ensure that encoding occurs within an amount of time that allows real-time transmission of video sequences to be realized, even if video encoder 20 operates at relatively slow clock speeds.

By way of example, image sensor 23 may comprise a camera. In particular, image sensor 23 may include a charge coupled device (CCD), a charge injection device, an array of photodiodes, a complimentary metal oxide semiconductor (CMOS) device, or any other photosensitive device capable of capturing video images or digital video sequences.

By way of example, video encoder 20 may comprise a DSP. Video encoder 20 may include an encoding controller 24 to selectively control motion encoder 26 and texture encoder 28. In other words, each of these components may comprise software modules executing on the DSP. Alternatively, one or more components of video encoder 20 may comprise specifically designed hardware components, or one or more ASICs, that execute one or more aspects of the techniques described herein. In any case, encoding controller 24 controls the encoding of video frames by selectively invoking motion encoder 26 and texture encoder 28. In many cases, both motion encoder 26 and texture encoder 28 are used during the encoding process associated with a video frame.

Motion encoder 26 performs computationally intensive motion estimation encoding techniques, such as those described in greater detail below. Texture encoder 28, on the other hand, performs less computationally intensive texture encoding techniques such as intra-frame compression commonly used for compressing still images. For example, texture encoder 28 may perform discrete cosine transform (DCT) encoding as is known in the art. Texture encoder 28 may be invoked in addition to motion encoder 26 in a first mode when motion estimation techniques are used, or in a second mode in lieu of motion estimator 26 when motion estimation techniques are avoided.

Encoding controller 24 may establish a threshold to define a computational budget for the encoding of a given video frame. Encoding controller 24 may store the threshold in memory 22, and access the threshold during the encoding routine in order to assess whether the computational budget has been exhausted. Encoding controller 24 may enable motion encoder 26 to execute motion estimation techniques as long as the computational budget has not been exhausted. However, if the computational budget has been exhausted, encoding controller 24 may disable motion encoder 26. In that case, any remaining encoding of the video frame can be performed simply using texture encoder 28, which requires significantly fewer computations, and thus fewer processing cycles. In this manner, encoding controller 24 can ensure that the encoding of a video frame is performed within an allocated amount of time, ensuring that real-time video sequences can be transmitted.

Encoding controller 24 may establish the threshold based in part on a known frequency associated with video encoder 20. As mentioned, video encoder 20 may comprise a digital signal processor (DSP) executing various software modules corresponding to encoding controller 24, texture encoder 28 and motion controller 26. The speed of video encoder 20 is generally fixed. In other words, the video encoder 20 typically operates at a defined frequency in terms of cycles per second (Hz). In one example, the video encoder 20 may operate at a 50 Megahertz clock speed such that it can execute approximately 50 million instructions per second. Faster or slower clock speeds may also be used. In any event, the threshold may be established based in part on the known clock speed of video encoder 20. In some cases, the threshold may be a fixed value programmed into encoding controller 24, and in other cases the threshold may be a dynamic value that is adjusted based on the number of processing cycles used to encode one or more previous video frames.

For example, encoding controller 24 may establish the threshold on a frame-by-frame basis, based on the number of processing cycles used to encode one or more previous video frames. Some frames may take longer to encode than other frames using the motion estimation techniques. Therefore, the computation budget may be defined, at least in part, by the average number of cycles used to encode previous video frames. In other words, if a previous video frame is encoded very quickly, the computational savings can be incorporated into the computational budget for a subsequent frame, possibly allowing an increased number of computations to be performed to encode the subsequent video frame. In one example, a moving average defining processing cycles associated with a number of previously encoded video frames may be used to define the computational budget for encoding subsequent video frames. In this manner, computational savings during the encoding of previously transmitted video frames may be recycled such that the encoding of a subsequent video frame can utilize the previous computational savings, if needed.

Encoding controller 24 may determine the number of processing cycles used during the encoding of a given video frame by specifically counting the number of clock cycles that are used, or by tracking the timing associated with the encoding of the video frame. In any case, encoding controller 24 monitors the number of processing cycles used during encoding of a given video frame and compares the number of used cycles to the threshold in order to determine whether the computational budget has been exhausted. If so, encoding controller 24 may disable motion encoder 26 and perform the remaining encoding of the frame using only texture encoder 28. However, as long as the computational budget has been exhausted, motion encoder 26 may be used because motion estimation techniques generally allow for increased compression and thus reduced bandwidth consumption during transmission of the video sequences.

During motion estimation encoding, motion encoder 26 compares a current video block associated with a current video frame to be encoded with various video blocks of a previous image frame or a subset thereof (or a subsequent image frame or subset thereof). Upon identifying a similar video block, motion encoder 26 determines the differences between the current video block and the similar video block. Encoding controller 24 may receive this information from motion encoder 26 and may forward the information to transmitter 14. Transmitter 14 can then transmit a motion vector that identifies the similar video block as well as the differences identified by motion encoder 26. Transmitter 14 may transmit encoded information for each image block, or may transmit the information for a complete image frame once the frame has been encoded. By encoding image blocks using motion vectors, the required bandwidth for transmission of streams of video data can be significantly reduced. However, by avoiding the use of motion estimation in certain instances, real-time transmission may be ensured.

Figure 3:
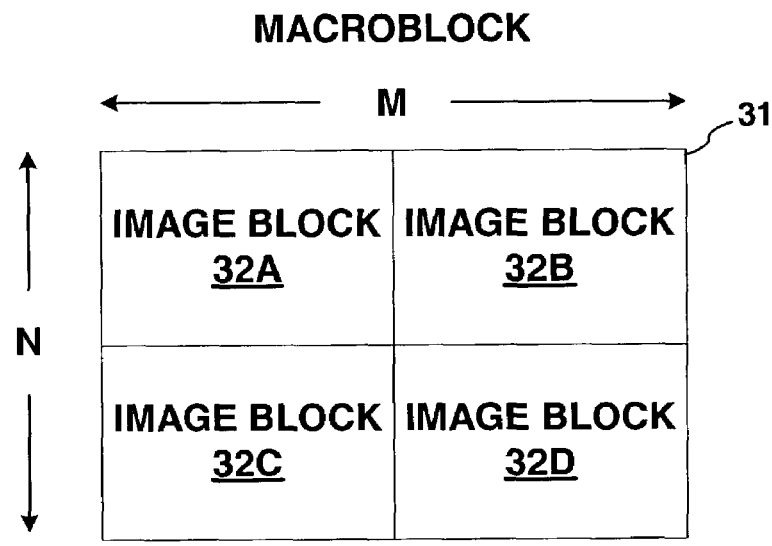
FIG. 3 is a conceptual illustration of an example macroblock of video data.

FIG. 3 illustrates an example macroblock 31 that can be stored within memory 22. MPEG standards and other video encoding schemes make use of macroblocks during motion estimation video encoding. In MPEG standards, the term macroblock refers to a 16 by 16 collection of pixel values that form a subset of a video image frame. Each pixel value may be represented by a byte of data, although larger or smaller number of bits could also be used to define each pixel in order to achieve the desired imaging quality. A macroblock may comprise a number of smaller 8 by 8 pixel image blocks 32. In general, however, the encoding techniques described herein may operate using blocks of any defined size, such as 16-byte by 16-byte macroblocks, 8-byte by 8-byte image blocks, or different sized video blocks, if desired.

Figure 4:
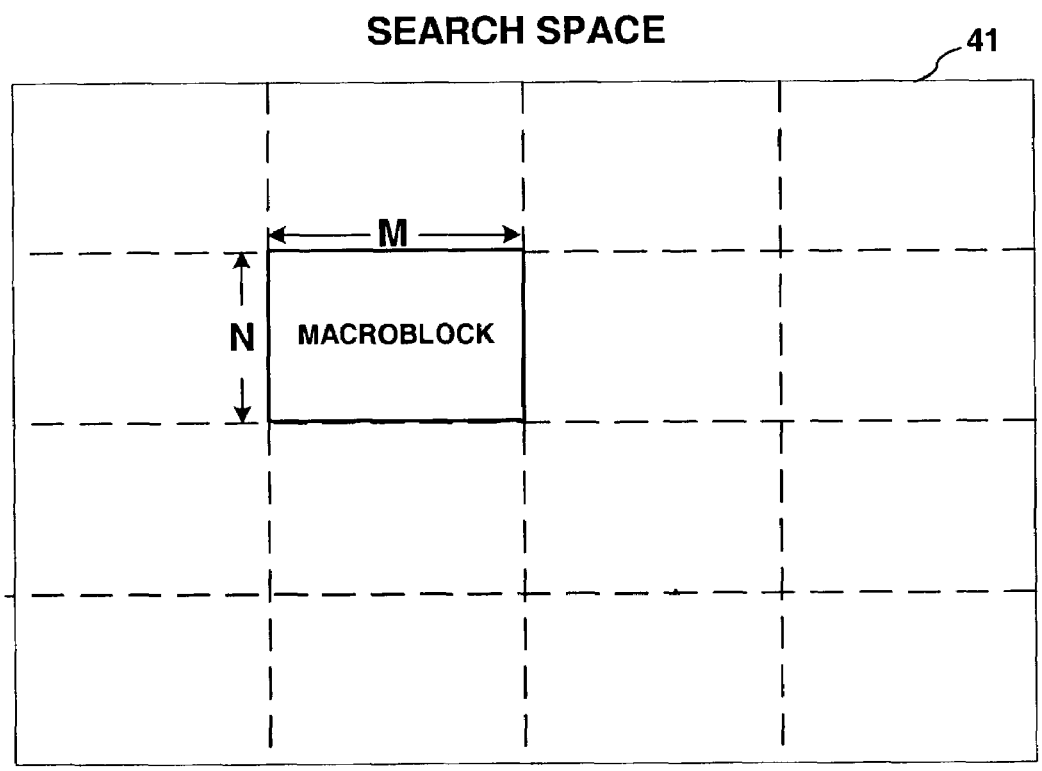
FIG. 4 is a conceptual illustration of an example search space.

FIG. 4 illustrates an example search space 41 that can be stored within memory. The search space 41 is a buffered collection of video blocks corresponding to a previously transmitted image frame (or a subsequent image frame of a sequence of frames). The search space may comprise the previous or subsequent image frame in its entirety, or a subset of the image frame, if desired. In general, a larger search space will result in more computations during motion estimation encoding because a larger search space defines more blocks that can be compared to the current block to be encoded, i.e., more tasks per iteration. Again, the current image frame is compared to blocks in the search space 41 in order to identify an adequate match so that the differences between the current block and the similar image block in the previous frame can be transmitted along with a motion vector that identifies the similar image block of the previous frame.

More specifically, during motion estimation video encoding, the motion encoder 26 can compare current video blocks to be encoded, with previous video blocks using comparison techniques, such as Sum of Absolute Difference (SAD) techniques or Sum of Squared Difference (SSD) techniques, as is well known in the art of video encoding. Other comparison techniques may also be used.

The SAD technique involves the tasks of performing absolute difference computations between pixel values of the current block to be encoded, with pixel values of the previous block to which the current block is being compared. The results of these absolute difference computations are summed, i.e., accumulated, in order to define a difference value indicative of the difference between the current video block and the previous video block to which the current video block is being compared. For an 8 by 8 pixel image block, 64 differences may be computed and summed, and for a 16 by 16 pixel macroblock, 256 differences may be computed and summed. In some cases, task computations may be terminated when an accumulated difference value exceeds the task threshold. In that case, the additional computations may be unnecessary.

The SSD technique also involves the task of performing difference computations between pixel values of the current block to be encoded with pixel values of the previous block to which the current block is being compared. In the SSD technique, the results of absolute difference computations are squared, and then the squared values are summed, i.e., accumulated, in order to define a difference value indicative of the difference between the current video block and the previous video block to which the current video block is being compared.

Alternatively, other comparison techniques such as a Mean Square Error (MSE), a Normalized Cross Correlation Function (NCCF), or another suitable comparison algorithm may be performed. In any case, however, motion estimation techniques require a very large number of computations to identify a match acceptable for video encoding using a motion vector. Accordingly, the motion estimation techniques may be avoided in certain scenarios where it is determined that the computational budget is not sufficient to allow motion estimation techniques to be performed within the allotted time.

Figure 5:
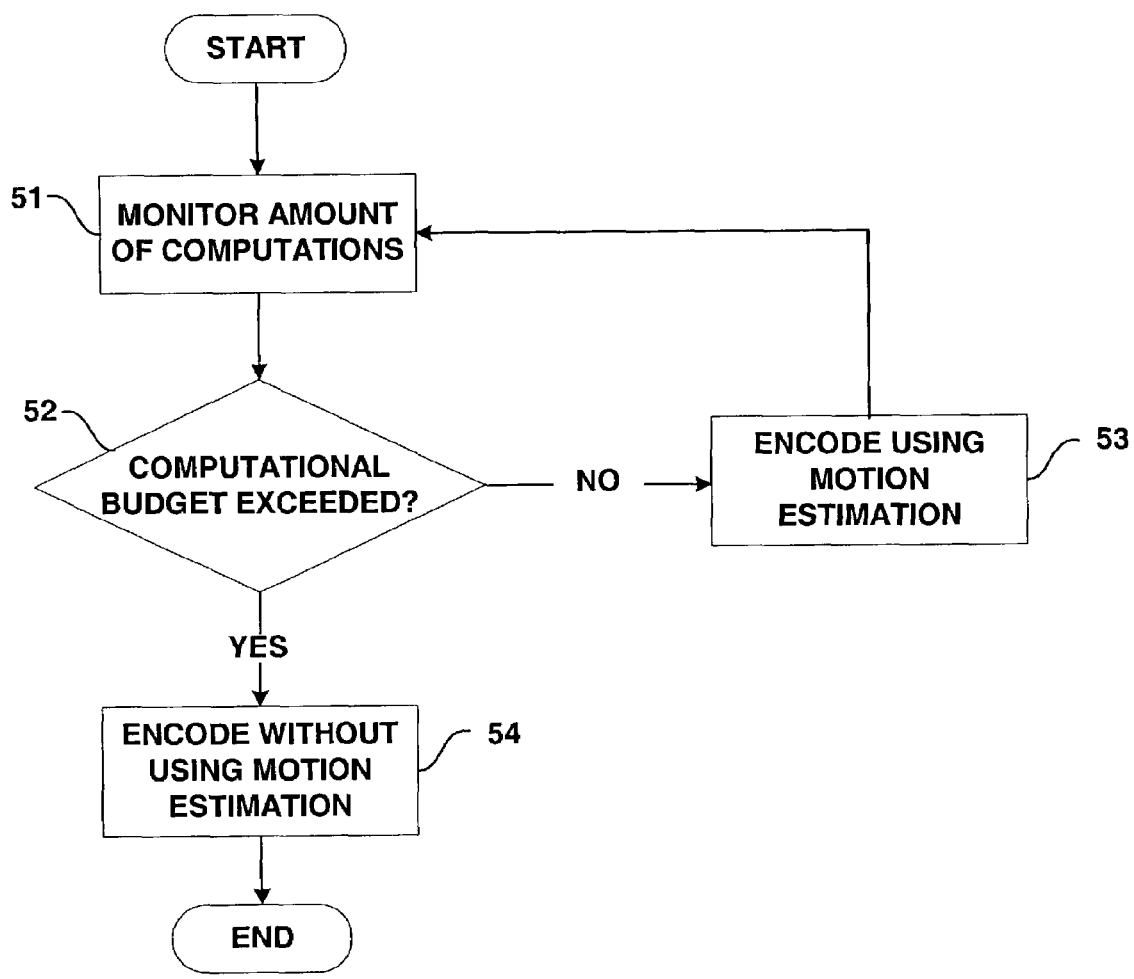
FIGS. 5-7 are flowcharts illustrating video encoding techniques that can be implemented in a digital video device.

FIG. 5 is a flow diagram illustrating a video encoding technique in accordance with the principles of this disclosure. As shown, during encoding a video frame, encoding controller 24 monitors the amount of computations (51), such as by counting or summing the number of processing cycles as they occur, or by timing the encoding process. If a computational budget is exceeded (yes branch of 52), for example, when a number of counted processing cycles exceeds an established threshold, the encoding process proceeds without using motion estimation techniques (53). For example, texture encoding, or other less computationally intensive encoding techniques may be used when the computational budget is exceeded (yes branch of 52). However, as long as the computational budget is not exceeded (no branch of 52), then motion estimation techniques are used for encoding (54). Motion estimation may be preferred if the computational resources are available because motion estimation encoding can result in increased data compression and thus reduced bandwidth consumption during transmission of video sequences.

Alternatively, the motion estimation techniques can be modified based on the extent of remaining computational resources. In other words, as the number of used processing cycles approaches the threshold, encoding controller may dynamically change the motion estimation techniques executed by motion encoder 26, such as by reducing the size of the search space for any given iteration. In this manner, motion estimation may be more readily exploited within the computational constraints.

Figure 6:
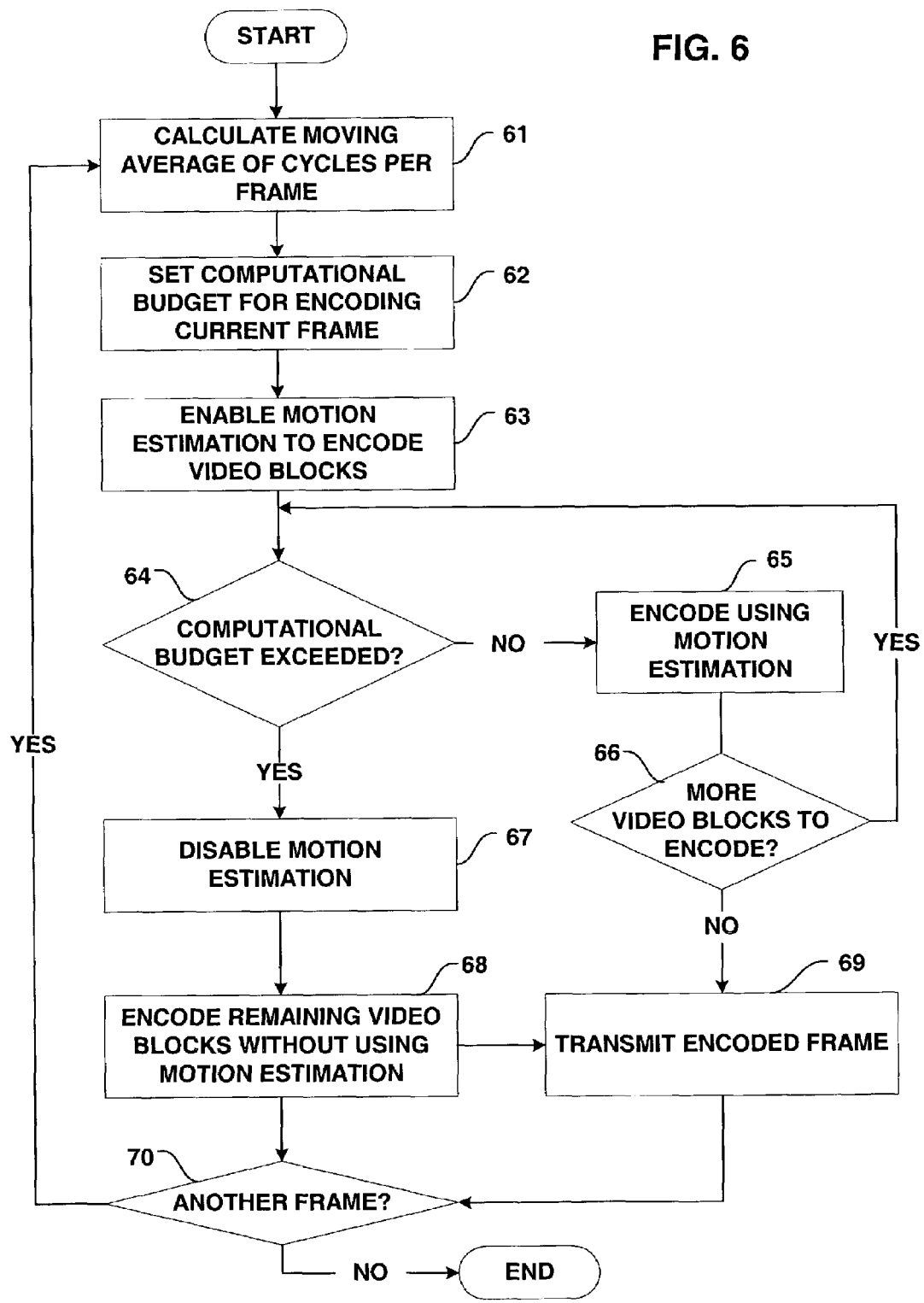

FIG. 6 is a more detailed flow diagram illustrating a video encoding technique in accordance with the principles of this disclosure. As shown in FIG. 6, encoding controller 24 of digital video device 10 begins encoding a video frame by calculating a moving average of cycles per frame (61). In other words, encoding controller 24 determines the average number of cycles per frame that were used to encode a number of previous video frames. Encoding controller 24 then sets a computational budget for encoding a current video frame. In particular, encoding controller 24 may define a threshold to define a number of processing cycles that can be used for motion estimation. The threshold may be defined by the clock speed of video encoder 20, and may be further defined, in part, by the calculated moving average. For example, if the average number of cycles per frame required to encode a number of previous video frames was significantly less than expected, the computational savings may be incorporated into the threshold so that additional computations can be performed. Similarly, if the average number of cycles per frame required to encode a number of previous video frames was significantly more than expected, the computational excess may be incorporated into the threshold so that fewer computations can be performed for later frames.

Encoding controller 24 may store the threshold in memory 22 so that the threshold can be accessed during the encoding routine.

Encoding controller 24 enables motion encoder 26 to encode image blocks using motion estimation techniques, such as those outlined above (63). During encoding, encoding controller 24 monitors and determines the number of processing cycles used, such as by counting a number of processing cycles used by video encoder 20, or by tracking an amount of time elapsed during the encoding of the current video block. Other estimation techniques may also be used to determine the number of used cycles. Encoding controller 24 then determines whether the computational budget has been exceeded (64), such as by comparing the number of processing cycles used during the encoding of the current video frame to the threshold stored in memory 22. If the computational budget has not been exceeded (no branch of 64), motion estimation is used to encode the video blocks (65). In some cases, if motion estimation is used, texture encoding techniques may be used in addition to the motion estimation encoding techniques. As long as additional video blocks of the frame still need to be encoded (yes branch of 66), the process of monitoring the computational budget (64) is repeated.

If encoding controller 24 determines that the computational budget has been exceeded (yes branch of 64), such as by determining that the number of processing cycles used during the encoding of the current video frame exceeds the threshold stored in memory 22, encoding controller disables motion encoder 26 (67). In that case, video encoder 20 encodes any remaining video blocks without using motion estimation techniques (68). For example, encoding controller 24 may disable motion encoder 26 and enable only texture encoder 28 so that the remaining video blocks can be encoded using texture encoding techniques. Additional encoders implementing other encoding techniques may be added in addition to, or in lieu of texture encoder 28. In some cases, when motion estimation is disabled, the full video frame may be encoded using only texture encoding techniques, discarding the motion vectors that were calculated. However, in most cases, the motion vectors that were calculated while motion encoder 26 was enabled can be used. In the later case, only the remaining video blocks that were not encoded using the motion estimation techniques may need to be encoded using only texture encoding techniques.

Figure 7:
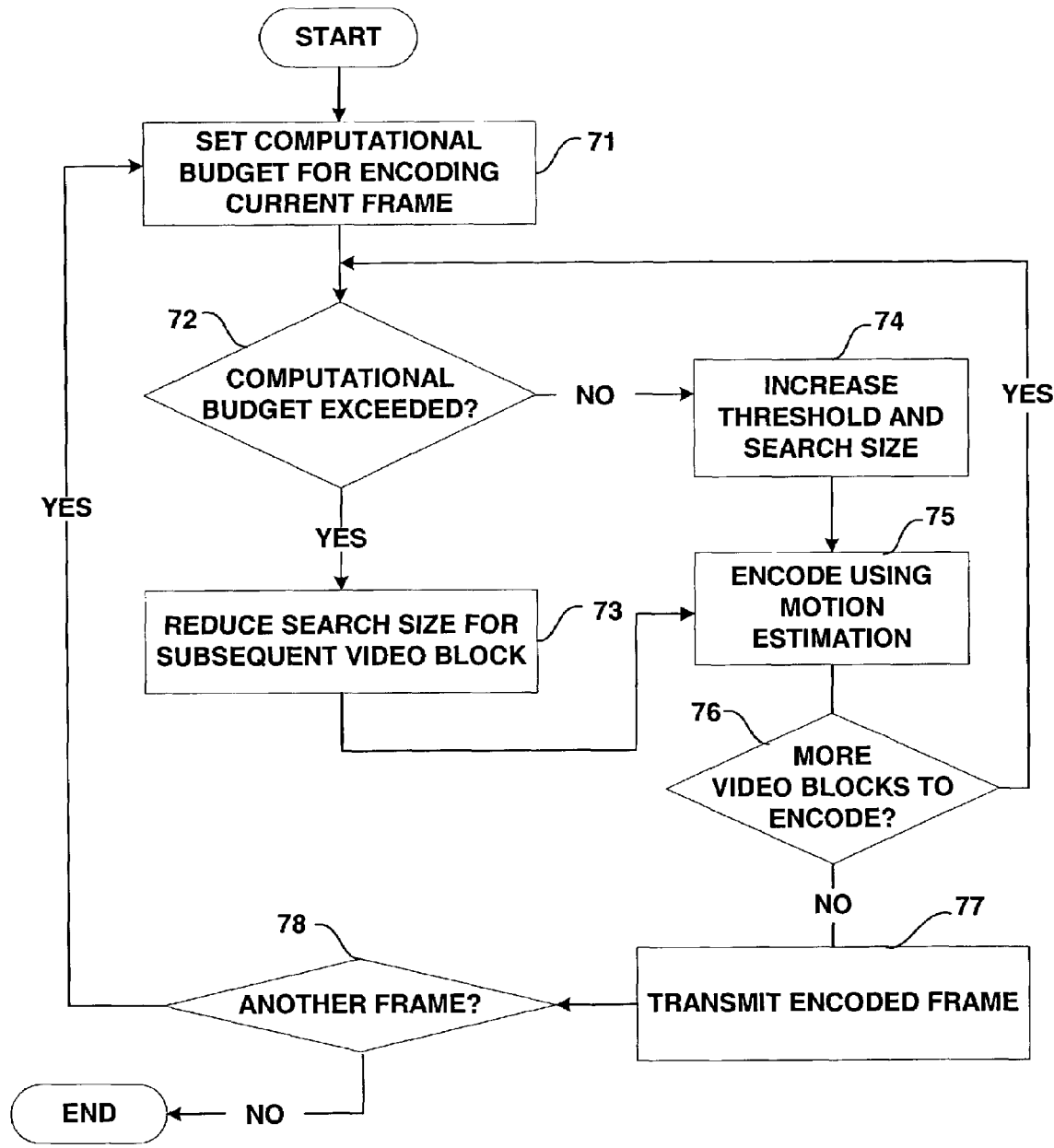

FIG. 7 is a flow diagram illustrating a variation of the video encoding technique of FIG. 6. In this case, encoding controller 24 sets a computational budget for encoding a current video frame (71). For example, encoding controller may calculate a moving average of cycles per frame and define a threshold to define a number of processing cycles that can be used for encoding. The threshold may be defined by the clock speed of video encoder 20, and may be further defined, in part, by the calculated moving average.

Encoding controller 24 then determines whether the computational budget has been exceeded (72), such as by comparing the number of processing cycles used during the encoding of the current video frame to the threshold stored in memory 22. If the computational budget has not been exceeded (no branch of 72), the threshold may be increased (74) to account for the under usage of previous frames, and motion estimation can be used to encode the video blocks (75). On the other hand, if the computational budget has been exceeded (yes branch of 72), the search size used for motion estimation of subsequent video blocks can be reduced, and motion estimation can be used (75). In other words, rather than terminate motion estimation altogether upon determining that the computational budget has been exceeded (as shown in FIG. 6), in FIG. 7, the technique modifies on a dynamic basis the scope of motion estimation that is performed. In this manner, the technique may dynamically adjust the number of computations to be performed. The measured or estimated computational use relative to the established computational budget can be examined on a periodic on constant basis to dynamically adjust the encoding algorithm. Such techniques can improve real-time encoding particularly in a resource limited platform, with the tradeoff in compression ratio.

Once the frame has been encoded, encoding controller 24 forwards the encoded frame from memory 22 to transmitter 14. Transmitter 14 can then transmit the encoded frame (77). The technique illustrated in FIG. 7 may then repeat to encode additional video frames (70). In still other examples, the technique shown in FIG. 7 may be extended across the encoding of two or more video frames. In other words, computational savings or excess associated with one frame may be accounted for in the establishment and/or modification of the budgeted threshold for subsequent frames, or in the defined size of the search that is performed for any given frame or any individual video block of a frame.

In some cases, frames encoded according to the techniques described herein may have a unique format that is compliant with one or more MPEG standards such as the MPEG-4 standard. For example, if the video frame defines (N) video blocks, a first set of video blocks defining a sequence of blocks (1 to M) may be substantially encoded using motion vectors. In some cases, a few of the video blocks in the first sequence may be encoded without using motions vectors, for example, if an acceptable motion vector is not identified for one or more blocks, and in other cases all of the video blocks in the first sequence may be encoded using motion vectors. A second set of video blocks defining a sequence of blocks (M+1 to N) may be encoded without using motion vectors. For example, when motion estimator 26 is disabled as outlined above, the remaining video blocks may be encoded using only texture encoder 28. A frame defined according to this format may be stored on a computer readable medium such as memory 22 of device 10. Additionally, a frame defined according to this format may be stored on a computer readable medium in the form of a carrier wave modulated with the encoded data. For example, the modulated carrier wave may be the medium used to transmit the frame from device 10 via transmitter 14 and antenna 12. In either case, the computer readable medium may comprise the image frame stored thereon.

A number of different embodiments have been described. For example, video encoding techniques are described which establish a computational budget for the encoding of video frames. The described techniques may be capable of improving video encoding by avoiding computations in certain scenarios, accelerating the encoding process, and possibly reducing power consumption during video encoding. In this manner, the techniques can improve video encoding according to standards such as MPEG-4, and can better facilitate the implementation of video encoding within wireless devices where computational resources are more limited and power consumption is a concern. In addition, the techniques may not affect interoperability with decoding standards such as the MPEG-4 decoding standard.

Nevertheless, various modifications can be made without departing from the spirit and scope of the claims. For example, in some cases, the motion estimation techniques can be modified based on the computational resources that are currently available. For example, searching techniques may be modified based on available computational resources during the encoding of any given video frame. In other words, in some cases, the computational budget may be more closely monitored in order to dynamically define the scope of motion estimation techniques that are used. In particular, the number of comparisons and searches used during motion estimation may be dynamically adjusted or defined based on the amount available computations as determined by the number of computations that have been used, relative to the threshold. For example, if more computational resources are available, more exhaustive searches may be used during motion estimation. However, as computational resources become more limited during the encoding of any given video frame, less exhaustive searches may be used. At some point motion estimation may be avoided altogether as outlined above. A number of different thresholds may be established to define when the motion estimation techniques should be modified, adjusted, or terminated. These or other modifications and extensions to the techniques described above may be implemented to improve the encoding process.

The techniques may be implemented in hardware, software, firmware, or any combination thereof. If implemented in software, the techniques may be directed to a computer readable medium comprising program code, that when executed in a device that encodes video streams compliant with an MPEG-4 standard, performs one or more of the methods mentioned above. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such as a DSP may execute instructions stored in memory in order to carry out one or more of the techniques described herein. In some cases, the techniques may be executed by a DSP that invokes various hardware components to accelerate the encoding process. In other cases, the video encoder may be implemented as a microprocessor, one or more application specific integrated circuits (ASICs), one or more field programmable gate arrays (FPGAs), or some other hardware-software combination. These and other embodiments are within the scope of the following claims.

The invention claimed is:

1. A computer readable medium encoded with computer executable instructions that upon execution by one or more processors in a device cause the device to:
   determine when a computational metric exceeds a threshold;
   encode a first sequence of video blocks according to a first encoding mode until the computational metric exceeds the threshold, wherein motion estimation techniques are used as part of the first encoding mode;
   switch from the first encoding mode to a second encoding mode when the computational metric exceeds the threshold;
   encode a second sequence of video blocks according to the second encoding mode after the computational metric exceeds the threshold, wherein motion estimation techniques are not used as part of the second encoding mode;
   switch from the second encoding mode to the first encoding mode when the computational metric no longer exceeds the threshold; and
   encode a third sequence of video blocks according to the first encoding mode after the computational metric no longer exceeds the threshold.

2. The computer readable medium of claim 1, wherein the computer readable medium is further encoded with instructions that cause the device to:
    count the number of processing cycles as they occur during encoding of a current video frame, wherein the instructions that cause the device to determine when the computational metric exceeds the threshold comprise instructions that cause the device to determine when the counted number of processing cycles exceeds the threshold.

3. The computer readable medium of claim 1, wherein the computer readable medium is further encoded with instructions that cause the device to:
    establish the threshold at least in part by calculating an average number of processing cycles associated with at least two previously encoded video frames.

4. The computer readable medium of claim 1, wherein at least a portion of the first sequence of video blocks and at least a portion of the second sequence of video blocks are part of a single video frame.

5. The computer readable medium of claim 1, wherein the instructions that cause the device to encode the first sequence of video blocks according to the first encoding mode comprise instructions that cause the device to:
    compare a video block to be encoded to at least one video block in a search space.

6. The computer readable medium of claim 1, wherein the instructions that cause the device to encode the second sequence of video blocks according to the second encoding mode comprise instructions that cause the device to:
    encode the second sequence of video blocks without comparing the video blocks in the second sequence of video blocks to other video blocks.

7. The computer readable medium of claim 1, wherein the threshold is a programmable threshold.

8. The computer readable medium of claim 1, wherein the computer readable medium is further encoded with instructions that cause the device to:
    establish the threshold based at least in part on a clock speed of the device.

9. The computer readable medium of claim 1, wherein the computer readable medium is further encoded with instructions that cause the device to:
    establish the threshold at least in part by calculating an average number of processing cycles associated with at least two previously encoded video blocks.

10. The computer readable medium of claim 1, wherein the computer readable medium is further encoded with instructions that cause the device to:
    track an amount of time elapsed during encoding of a current video frame, wherein the instructions that cause the device to determine when the computational metric exceeds the threshold comprise instructions that cause the device to determine when the tracked amount of time exceeds the threshold.

11. The computer readable medium of claim 1, wherein the computer readable medium is further encoded with instructions that cause the device to:
    establish the threshold to define a computational budget for encoding of a video frame.

12. The computer readable medium of claim 1, wherein the computer readable medium is further encoded with instructions that cause the device to:
    establish the threshold to define a number of available processing cycles for encoding a video frame.

13. The computer readable medium of claim 1, wherein the video blocks are encoded according to an MPEG-4 standard.

14. A method comprising:
    determining when a computational metric exceeds a threshold;
    encoding a first sequence of video blocks according to a first encoding mode until the computational metric exceeds the threshold, wherein motion estimation techniques are used as part of the first encoding mode;
    switching from the first encoding mode to a second encoding mode when the computational metric exceeds the threshold;
    encoding a second sequence of video blocks according to the second encoding mode after the computational metric exceeds the threshold, wherein motion estimation techniques are not used as part of the second encoding mode;
    switching from the second encoding mode to the first encoding mode when the computational metric no longer exceeds the threshold; and
    encoding a third sequence of video blocks according to the first encoding mode after the computational metric no longer exceeds the threshold.

15. The method of claim 14, further comprising:
    counting the number of processing cycles as they occur during encoding of a current video frame, wherein determining when the computational metric exceeds the threshold comprises determining when the counted number of processing cycles exceeds the threshold.

16. The method of claim 14, further comprising:
    establishing the threshold at least in part by calculating an average number of processing cycles associated with at least two previously encoded video frames.

17. The method of claim 14, wherein at least a portion of the first sequence of video blocks and at least a portion of the second sequence of video blocks are part of a single video frame.

18. The method of claim 14, wherein encoding the first sequence of video blocks according to the first encoding mode comprises:
    comparing a video block to be encoded to at least one video block in a search space.

19. The method of claim 14, wherein encoding the second sequence of video blocks according to the second encoding mode comprises:
    encoding the second sequence of video blocks without comparing the video blocks in the second sequence of video blocks to other video blocks.

20. The method of claim 14, wherein the threshold is a programmable threshold.

21. The method of claim 14, further comprising:
    establishing the threshold based at least in part on a clock speed of an encoder.

22. The method of claim 14, further comprising:
    establishing the threshold at least in part by calculating an average number of processing cycles associated with at least two previously encoded video blocks.

23. The method of claim 14, further comprising:
    tracking an amount of time elapsed during encoding of a current video frame, wherein determining when the computational metric exceeds the threshold comprises determining when the tracked amount of time exceeds the threshold.

24. The method of claim 14, further comprising:
    establishing the threshold to define a computational budget for encoding of the video frame.

25. The method of claim 14, further comprising:
    establishing the threshold to define a number of available processing cycles for encoding a video frame.

26. The method of claim 14, wherein the video blocks are encoded according to an MPEG-4 standard.

27. An apparatus comprising:
means for determining when a computational metric exceeds a threshold;
means for encoding a first sequence of video blocks according to a first encoding mode until the computational metric exceeds the threshold, wherein motion estimation techniques are used as part of the first encoding mode;
means for switching from the first encoding mode to a second encoding mode when the computational metric exceeds the threshold;
means for encoding a second sequence of video blocks according to the second encoding mode after the computational metric exceeds the threshold, wherein motion estimation techniques are not used as part of the second encoding mode;
means for switching from the second encoding mode to the first encoding mode when the computational metric no longer exceeds the threshold; and
means for encoding a third sequence of video blocks according to the first encoding mode after the computational metric no longer exceeds the threshold.

28. The apparatus of claim 27, further comprising:
means for counting the number of processing cycles as they occur during encoding of a current video frame, wherein the means for determining when the computational metric exceeds the threshold comprises means for determining when the counted number of processing cycles exceeds the threshold.

29. The apparatus of claim 27, further comprising:
means for establishing the threshold at least in part by calculating an average number of processing cycles associated with at least two previously encoded video frames.

30. The apparatus of claim 27, wherein at least a portion of the first sequence of video blocks and at least a portion of the second sequence of video blocks are part of a single video frame.

31. The apparatus of claim 27, wherein the means for encoding the first sequence of video blocks according to the first encoding mode comprises:
means for comparing a video block to be encoded to at least one video block in a search space.

32. The apparatus of claim 27, wherein the means for encoding the second sequence of video blocks according to the second encoding mode comprises:
means for encoding the second sequence of video blocks without comparing the video blocks in the second sequence of video blocks to other video blocks.

33. The apparatus of claim 27, wherein the threshold is a programmable threshold.

34. The apparatus of claim 27, further comprising:
means for establishing the threshold based at least in part on a clock speed of the apparatus.

35. The apparatus of claim 27, further comprising:
means for establishing the threshold at least in part by calculating an average number of processing cycles associated with at least two previously encoded video blocks.

36. The apparatus of claim 27, further comprising:
means for tracking an amount of time elapsed during encoding of a current video frame, wherein the means for determining when the computational metric exceeds the threshold comprises means for determining when the tracked amount of time exceeds the threshold.

37. The apparatus of claim 27, further comprising:
means for establishing the threshold to define a computational budget for encoding of the video frame.

38. The apparatus of claim 27, further comprising:
means for establishing the threshold to define a number of available processing cycles for encoding a video frame.

39. The apparatus of claim 27, further comprising:
means for capturing video frames in real-time, wherein the means for encoding encodes the video frames in real-time; and
means for transmitting the encoded video frames in real-time.

40. The apparatus of claim 27, wherein the video frames are encoded according to an MPEG-4 standard.

41. The apparatus of claim 27, wherein the apparatus comprises a digital signal processor that executes computer executable instructions.

42. The apparatus of claim 27, wherein the apparatus is a battery powered apparatus.

43. The apparatus of claim 27, wherein the apparatus is a wireless apparatus.

44. The apparatus of claim 43, wherein the wireless apparatus is selected from the group consisting of: a personal digital assistant, a laptop computer, a desktop computer, a digital-camera, a digital recording apparatus, a cellular radio-telephone having video capabilities, and a satellite radiotelephone having video capabilities.

45. A device comprising:
an encoder that determines when a computational metric exceeds a threshold, encodes a first sequence of video blocks according to a first encoding mode until the computational metric exceeds the threshold, switches from the first encoding mode to a second encoding mode when the computational metric exceeds the threshold, encodes a second sequence of video blocks according to the second encoding mode after the computational metric exceeds the threshold, switches from the second encoding mode to the first encoding mode when the computational metric no longer exceeds the threshold, and encodes a third sequence of video blocks according to the first encoding mode after the computational metric no longer exceeds the threshold, wherein motion estimation techniques are used as part of the first encoding mode, and wherein motion estimation techniques are not used as part of the second encoding mode;
a transmitter that transmits the first sequence of video blocks, the second sequence of video blocks, and the third sequence of video blocks.

46. The device of claim 45, wherein the encoder counts the number of processing cycles as they occur during encoding of a current video frame, and wherein the encoder determines when the counted number of processing cycles exceeds the threshold.

47. The device of claim 45, wherein the encoder establishes the threshold at least in part by calculating an average number of processing cycles associated with at least two previously encoded video frames.

48. The device of claim 45, wherein at least a portion of the first sequence of video blocks and at least a portion of the second sequence of video blocks are part of a single video frame.

49. The device of claim 45, wherein the encoder encodes the first sequence of video blocks according to the first encoding mode by comparing a video block to be encoded to at least one video block in a search space.

50. The device of claim 45, wherein the encoder encodes the second sequence of video blocks without comparing the video blocks in the second sequence of video blocks to other video blocks.

51. The device of claim 45, wherein the threshold is a programmable threshold.

52. The device of claim 45, wherein the encoder establishes the threshold based at least in part on a clock speed of the device.

53. The device of claim 45, wherein the encoder establishes the threshold at least in part by calculating an average number of processing cycles associated with at least two previously encoded video blocks.

54. The device of claim 45, wherein the encoder tracks an amount of time elapsed during encoding of a current video frame, wherein the determines when the tracked amount of time exceeds the threshold.

55. The device of claim 45, wherein the encoder establishes the threshold to define a computational budget for encoding of the video frame.

56. The device of claim 45, wherein the encoder establishes the threshold to define a number of available processing cycles for encoding a video frame.

57. The device of claim 45, further comprising an image sensor to capture video frames in real-time, wherein the encoder encodes the video frames in real-time and wherein the transmitter transmits the encoded video frames in real-time.

58. The device of claim 45, wherein the video blocks are encoded according to an MPEG-4 standard.

59. The device of claim 45, wherein the encoder comprises a digital signal processor that executes computer executable instructions.

60. The device of claim 45, wherein the device is a battery powered device.

61. The device of claim 45, wherein the device is a wireless device.

62. The device of claim 61, wherein the wireless device is selected from the group consisting of: a personal digital assistant, a laptop computer, a desktop computer, a digital camera, a digital recording device, a cellular radiotelephone having video capabilities, and a satellite radiotelephone having video capabilities.

* * * * *